United States Patent Office 3,216,847
Patented Nov. 9, 1965

3,216,847
FRIT COMPOSITIONS FOR VITREOUS
ENAMELS
David L. Armant, New Shrewsbury, N.J., assignor to
National Lead Company, New York, N.Y., a corporation of New Jersey
No Drawing. Filed Mar. 21, 1962, Ser. No. 181,473
2 Claims. (Cl. 117—70)

This invention relates to frit compositions for use in preparing vitreous enamels. More specifically it relates to frit compositions which are useful in preparing opacified vitreous enamels for cast iron products.

Many different types of frit compositions have been prepared and used in the vitreous enameling industry for many purposes. Some of the known compositions are used to coat ceramic materials while others are used to coat metal products. Among the metal products which are coated are sheet steel, aluminum, various alloys and cast iron. This invention is concerned primarily with the preparation of a frit composition which is useful for coating cast iron products.

Prior art processes teach that cast iron may be coated by using either a wet or a dry process. In the wet process the ground frit composition is made into a slip which is subsequently sprayed onto the surface of the metal to be coated and then the coated metal is heated to mature the enamel. In the dry process the metal surface is sprayed with a thin ground coat, then heated and the frit composition is dusted onto the heated surface to produce the vitreous enamel coating.

In general it has been found that vitreous enamels prepared by using the dry process are more durable and more brilliant than those produced by the wet process.

This invention covers the prepartion of frit compositions which are most useful to coat cast iron products using the dry process. Among the frit compositions known in the art which are used in the dry process to coat cast iron are those in which the opacifying agent is either antimony or tin oxides. This results in relatively low hiding power or reflectance. Many of these enamels are not resistant to acids and therefore have limited use.

An object of the instant invention, therefore, is to produce a frit composition which is useful in coating cast iron. Another object is to produce a frit composition which may be used to coat cast iron by the dry precess which produces a vitreous enamel coating having a clean white color and high hiding power. A further object is to produce a titanium opacified vitreous enamel coating on cast iron which is glossy, durable and has a high reflectance value. A further object is to provide a method for producing a vitreous enamel coating on cast iron which has high reflectance and stainless acid resistance.

These and other objects will become more apparent by the following more complete description of the instant invention.

Broadly, this invention contemplates a frit composition which is capable of forming a vitreous enamel coating on cast iron, said coating having high hiding power, which comprises the following ingredients:

| | Percent |
|---|---|
| $Na_2O$ | 0 to 15 |
| $K_2O$ | 5 to 19 |
| $Li_2O$ | 0 to 4 |
| $B_2O_3$ | 10 to 20 |
| $SiO_2$ | 38 to 48 |
| $TiO_2$ | 18 to 28 |
| $Al_2O_3$ | 0 to 3 |
| $P_2O_5$ | 0 to 3 |
| $As_2O_5$ | 0 to 3 |
| Metal oxide selected from the group consisting of MgO and ZnO | 0 to 3 | the sum of the alkali metal oxides being from 12% to 20%, and in which at least 1% is an alkali metal oxide selected from the group consisting of $Na_2O$ and $Li_2O$, the sum of $Al_2O_3+P_2O_5+As_2O_5+$metal oxide selected from the group consisting of MgO and ZnO being from 0% to 9%. All of the percentages are expressed on a weight basis.

This invention also contemplates a vitreous enamel composition on cast iron and a method for producing the same by applying the above frit composition onto the heated surface of a ground coated cast iron product and maturing said frit to form the vitreous enamel coating.

The frit composition is prepared in the usual manner. The ingredients are dry blended to form a mixture and the mixture is melted in a heated furnace or kiln until a homogeneous mass is obtained. The molten mass is then cooled quickly, preferably by quenching in water to form the frit material. The frit material is then dried, milled and screened. It is now ready for use as a coating material for cast iron products.

In order to use this frit material for coating cast iron, the metal surface is first cleaned by saind blasting. The cleaned metal surface is then covered with one of the well-known ground coats. The ground coat is sprayed as a slip onto the metal surface and then dried. The ground coat is usually applied as a thin layer and has little or no opacity.

As stated previously, the frit composition of the instant invention preferably is applied to the surface of the cast iron by using the dry method. In the instant process the cast iron metal surface containing the ground coat is heated up to the maturing temperature of the enamel frit composition, usually between 825° C. and 875° C., and the finely ground frit composition is then screened onto the heated surface. The frit composition melts and matures into the vitreous enamel coating of the instant invention which has a glossy smooth texture, a good clean white color having high opacity and high reflectance values.

In order to illustrate more fully the instant invention, the following examples are presented:

EXAMPLE 1.—PREPARATION OF THE FRIT
COMPOSITION

The following ingredients were dry blended to form a mixture

| Ingredients: | Parts by weight |
|---|---|
| Potassium nitrate ($KNO_3$) | 17.2 |
| Lithium carbonate ($Li_2CO_3$) | 2.5 |
| Anhydrous borax ($Na_2B_4O_7$) | 19.5 |
| Boric acid ($3H_2O \cdot B_2O_3$) | 2.5 |
| Silica ($SiO_2$) | 43.0 |
| Titanium dioxide ($TiO_2$) | 22.0 |
| Calcined alumina ($Al_2O_3$) | 1.0 |
| Magnesium carbonate ($MgCO_3$) | 2.1 |
| Ammonium phosphate ($NH_4H_2PO_4$) | 3.2 |
| Arsenic oxide ($As_2O_5$) | 1.0 |

The mixture was then placed in a fire clay container and melted at 1300° C. for approximately 2 hours at which time the molten mass appeared to be homogeneous and free from undissolved material. The molten mass was then removed from the furnace and quenched in water to form the frit material. The frit material was then dried at 100° C., dry ground in a ball mill for 5 hours and finally screened through a 100 mesh sieve.

The frit composition had the following analysis:

| Ingredients: | Percent by weight |
|---|---|
| $Na_2O$ | 6.0 |
| $K_2O$ | 8.0 |
| $Li_2O$ | 1.0 |
| $B_2O_3$ | 15.0 |
| $SiO_2$ | 43.0 |
| $TiO_2$ | 22.0 |
| $Al_2O_3$ | 1.0 |
| $P_2O_5$ | 2.0 |
| MgO | 1.0 |
| $As_2O_5$ | 1.0 |

EXAMPLES 2–10

Other frit compositions were prepared according to the procedure used in Example 1. These frits were then used to coat cast iron products by the method described in Example 1. In all cases the vitreous enamel coatings were smooth, glossy, hard and durable. They all possessed reflectance values of at least 90% and they had acid resistance ratings of "AA" to "A." The ingredients employed and compositions of the frits prepared are summarized in the following tables along with those of Example 1.

TABLE I

| | Expressed as parts by weight | | | | | | | | | |
|---|---|---|---|---|---|---|---|---|---|---|
| Examples | 1 | 2 | 3 | 4 | 5 | 6 | 7 | 8 | 9 | 10 |
| Ingredients employed: | | | | | | | | | | |
| Potassium nitrate | 17.2 | 16.1 | 36.6 | 17.2 | 17.2 | 17.2 | 17.2 | 17.2 | 17.2 | 17.2 |
| Lithium carbonate | 2.5 | 2.5 | 2.5 | ---- | 2.5 | 2.5 | 2.5 | 2.5 | 2.5 | 2.5 |
| Borax (anhydrous) | 19.5 | 17.9 | ---- | 19.5 | 16.2 | 16.2 | 16.2 | 17.3 | 19.5 | 19.5 |
| Boric acid | 2.5 | 6.4 | 26.6 | 2.5 | 8.5 | 8.5 | 8.5 | ---- | 2.5 | 2.5 |
| Silica | 43.0 | 43.2 | 41.0 | 43.0 | 43.0 | 43.0 | 43.0 | 41.2 | 41.2 | 45.2 |
| Titanium dioxide | 22.0 | 22.0 | 26.0 | 22.0 | 22.0 | 22.0 | 22.0 | 22.1 | 20.0 | 22.1 |
| Calcined alumina | 1.0 | 1.0 | 2.0 | 1.0 | ---- | ---- | ---- | 1.0 | 1.0 | 1.0 |
| Magnesium carbonate | 2.1 | 2.1 | ---- | 2.1 | ---- | ---- | ---- | 1.6 | 1.6 | 1.6 |
| Ammonium phosphate | 3.2 | 2.9 | 3.2 | 3.2 | 3.2 | ---- | ---- | 2.9 | 2.9 | 2.9 |
| Arsenic pentoxide | 1.0 | 1.0 | 1.0 | 1.0 | 1.0 | 1.0 | ---- | 1.0 | 1.0 | 1.0 |
| Sodium carbonate | | | | | | | | 1.2 | | |

TABLE II

| | Expressed as percent by weight | | | | | | | | | |
|---|---|---|---|---|---|---|---|---|---|---|
| Examples | 1 | 2 | 3 | 4 | 5 | 6 | 7 | 8 | 9 | 10 |
| Composition of frit and enamel: | | | | | | | | | | |
| $Na_2O$ | 6.0 | 5.5 | ---- | 6.1 | 5.1 | 5.2 | 5.3 | 6.3 | 6.3 | 5.9 |
| $K_2O$ | 8.0 | 7.5 | 16.2 | 8.1 | 8.2 | 8.3 | 8.4 | 8.4 | 8.4 | 7.9 |
| $Li_2O$ | 1.0 | 1.0 | 1.0 | ---- | 1.0 | 1.0 | 1.1 | 1.1 | 1.0 | 1.0 |
| $B_2O_3$ | 15.0 | 16.0 | 14.3 | 15.2 | 16.3 | 16.7 | 16.8 | 12.6 | 15.7 | 14.7 |
| $SiO_2$ | 43.0 | 43.2 | 39.0 | 43.4 | 43.9 | 44.9 | 45.2 | 43.4 | 43.0 | 44.3 |
| $TiO_2$ | 22.0 | 22.0 | 24.7 | 22.2 | 22.5 | 22.9 | 23.2 | 23.3 | 20.9 | 21.6 |
| $Al_2O_3$ | 1.0 | 1.0 | 1.9 | 1.0 | ---- | ---- | ---- | 1.1 | 1.0 | 1.0 |
| $P_2O_5$ | 2.0 | 1.8 | 1.9 | 2.0 | 2.0 | ---- | ---- | 1.9 | 1.9 | 1.8 |
| MgO | 1.0 | 1.0 | ---- | 1.0 | ---- | ---- | ---- | 0.8 | 0.8 | 0.8 |
| $As_2O_5$ | 1.0 | 1.0 | 1.0 | 1.0 | 1.0 | 1.0 | ---- | 1.1 | 1.0 | 1.0 |

*Method for coating cast iron*

A cast iron panel was sand blasted to clean the surface. The cleaned metal surface was then sprayed with a slip to form a thin ground coat. The ground coat employed was a well-known feldspar, borax and quartz composition.

The ground coat on the metal surface was then dried to remove the water from the slip. The ground coat was only slightly opaque and had a thickness of approximately 0.003 inch.

After drying, the ground coated metal surface was then heated to 850° C. and the frit composition of the instant invention described above was screened onto the heated surface. After applying the frit, the metal surface was heated for 2 minutes during which time the frit matured into an enamel on the surface of the metal. Upon cooling the enamelled coating was smooth and glossy in appearance, possessed a good clean white color of high opacity and was hard, durable and resistant to acids. The enamel thickness was approximately .035 inch. Reflectance, as determined with a standard reflectometer of the type used by the porcelain enameling industry, was 94.8 percent. Acid resistance, as determined by the standard spot test method of the Porcelain Enamel Institute, was rated at "AA." These tests are described in detail in Nat. Bureau of Standards Research Paper RP 1345, J. Nat. Bur. Stds., 25, 581–618 (1940) and ASTM Standards, 5, 487–491 (1958) respectively.

From the above description and by the examples presented, it has clearly been shown that smooth, glossy white enamel coatings may be formed on cast iron products. These enamels are durable and possess high reflectance values. The frit formed is easily converted to an enamel coating on cast iron by using a dry process.

While this invention has been described and illustrated by the examples shown, it is not intended to be strictly limited thereto, and other variations and modifications may be employed within the scope of the following claims.

I claim:

1. A durable, adherent vitreous enamel coating on a cast iron product, said coating consisting of the following composition:

| | Percent |
|---|---|
| $Na_2O$ | 0 to 15 |
| $K_2O$ | 5 to 19 |
| $Li_2O$ | 0 to 4 |
| $B_2O_3$ | 10 to 20 |
| SiO | 38 to 48 |
| $TiO_2$ | 18 to 28 |
| $Al_2O_3$ | 0 to 3 |
| $P_2O_5$ | 0 to 3 |
| $As_2O_5$ | 0 to 3 |
| Metal oxide selected from the group consisting of MgO and ZnO | 0 to 3 | the sum of the alkali metal oxides being from 12% to 20% and in which at least 1% is an alkali metal oxide selected from the group consisting of $Na_2O$ and $Li_2O$, the sum of the $Al_2O_3+P_2O_5+As_2O_5+$ metal oxide selected from the group consisting of MgO and ZnO being from 0% to 9%, all of the percentages expressed on a weight basis, said coating having a clean white color, glossy appearance, a high reflectance value and stainless acid resistance.

2. A method for preparing a glossy, highly reflectant, titanium opacified vitreous enamel coating on a cast iron product which comprises, heating a ground coated cast iron product at the maturing temperature of a frit composition, applying said frit composition as a powder onto the ground coated surface and heating at a temperature of 825° C. to 875° C. to mature said vitreous enamel coating, said frit composition consisting of the following composition:

| | Percent |
|---|---|
| $Na_2O$ | 0 to 15 |
| $K_2O$ | 5 to 19 |
| $Li_2O$ | 0 to 4 |
| $B_2O_2$ | 10 to 20 |
| $SiO_2$ | 38 to 48 |
| $TiO_2$ | 18 to 28 |
| $Al_2O_3$ | 0 to 3 |
| $P_2O_5$ | 0 to 3 |
| $As_2O_5$ | 0 to 3 |
| Metal oxide selected from the group consisting of MgO and ZnO | 0 to 3 | the sum of the alkali metal oxides being from 12% to 20% and in which at least 1% is an alkali metal oxide selected from the group consisting of $Na_2O$ and $Li_2O$, the sum of the $Al_2O_3+P_2O_5+As_2O_5+$ metal oxide selected from the group consisting of MgO and ZnO being from 0% to 9% all of the percentages expressed on a weight basis.

References Cited by the Examiner
UNITED STATES PATENTS

| | | | |
|---|---|---|---|
| 2,753,271 | 7/56 | Treptow | 106—48 |
| 2,837,443 | 6/58 | Zander | 117—129 |
| 2,890,964 | 6/59 | Commons et al. | 106—48 |
| 2,930,713 | 3/60 | Hoffman | 117—129 |
| 2,959,503 | 11/60 | Lindson | 117—129 |
| 3,017,279 | 1/62 | Van Dolah et al. | 106—48 |

TOBIAS E. LEVOW, *Primary Examiner*.

JOSEPH REBOLD, *Examiner*.